Nov. 1, 1955 E. G. OPSAHL 2,722,292
BRAKE BEAM WITH SAFETY SUPPORT
Filed Aug. 1, 1952 3 Sheets-Sheet 3
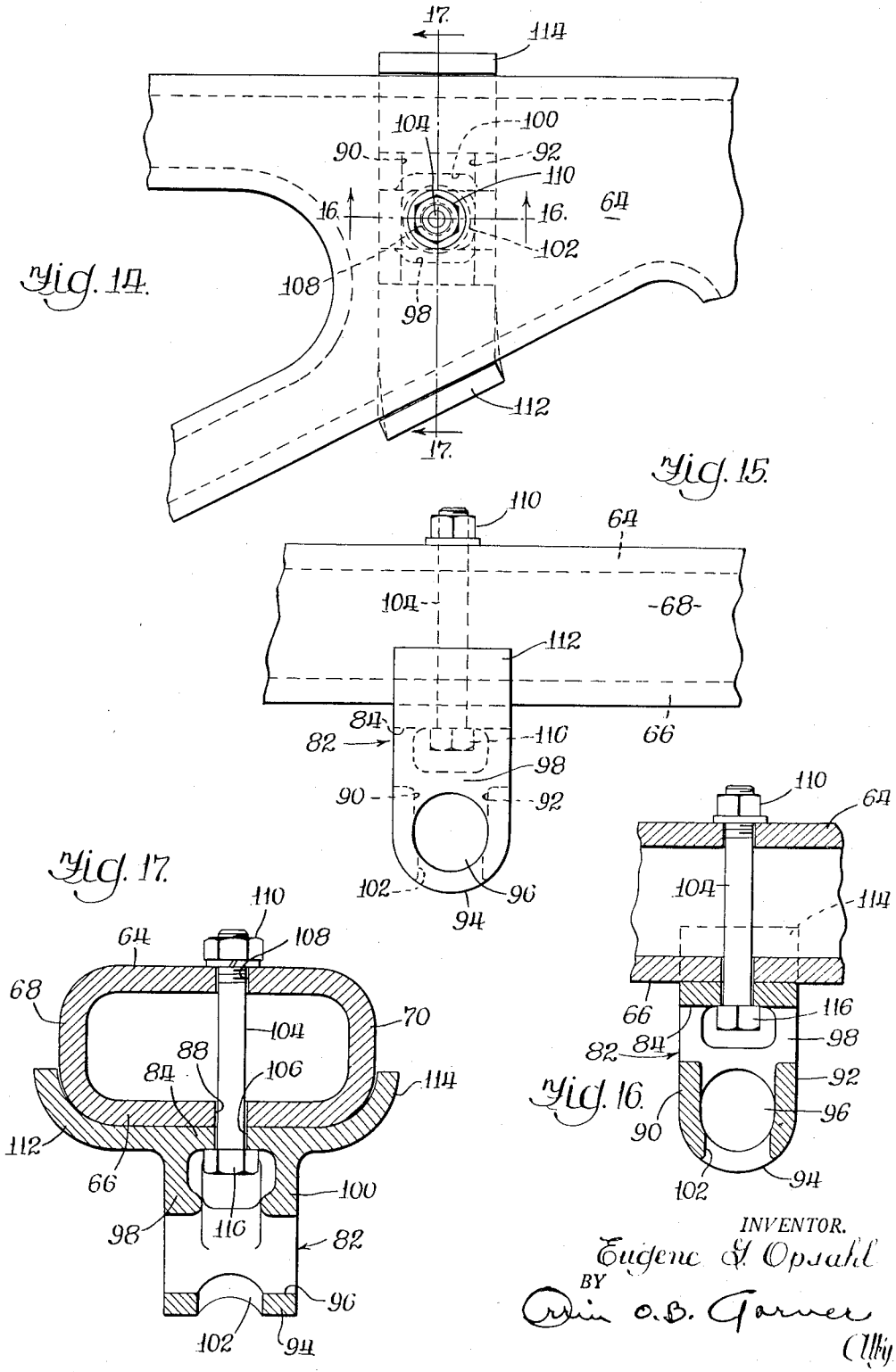
INVENTOR.
Eugene G. Opsahl
BY
Orrin O.B. Garner
Atty United States Patent Office 2,722,292
Patented Nov. 1, 1955

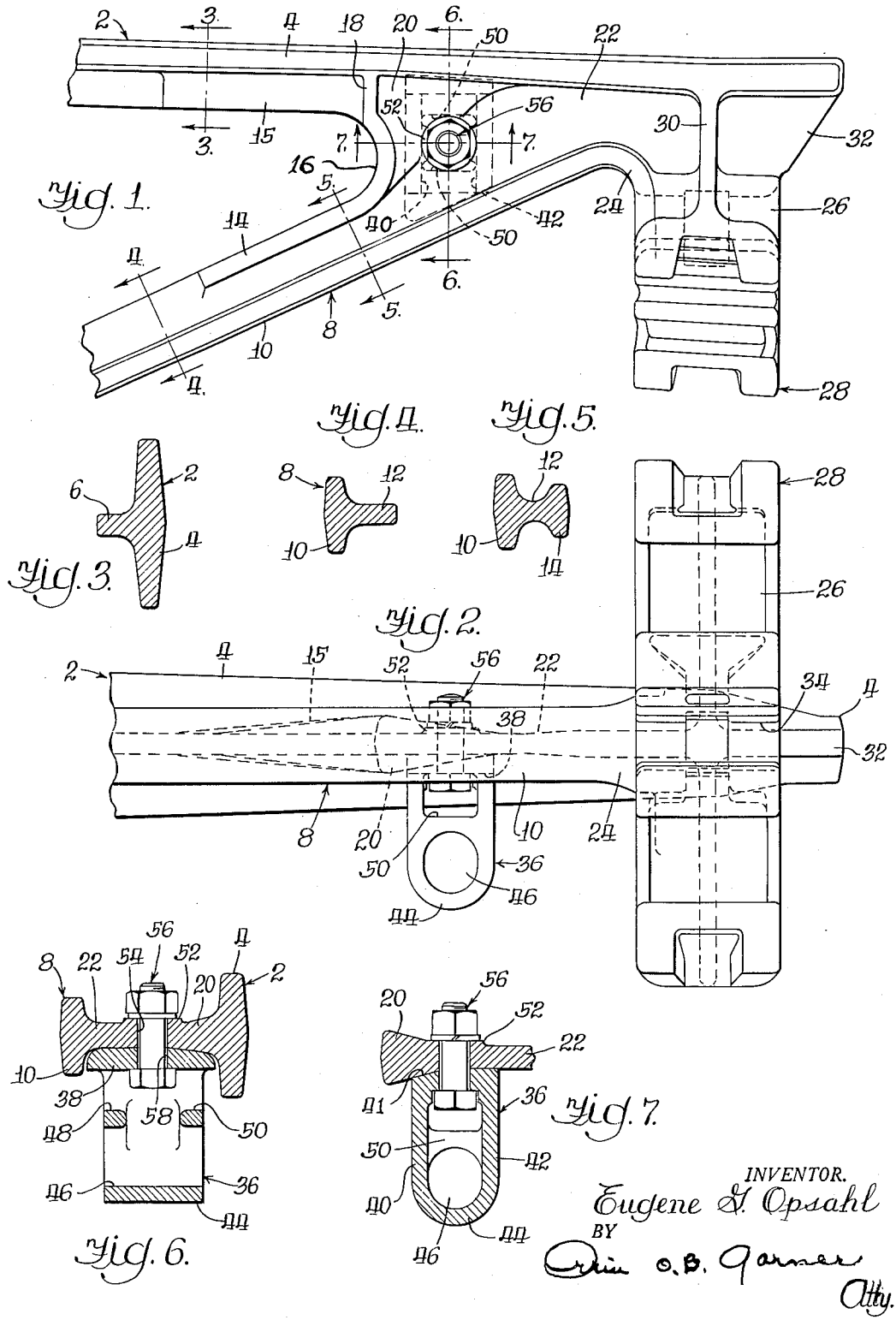

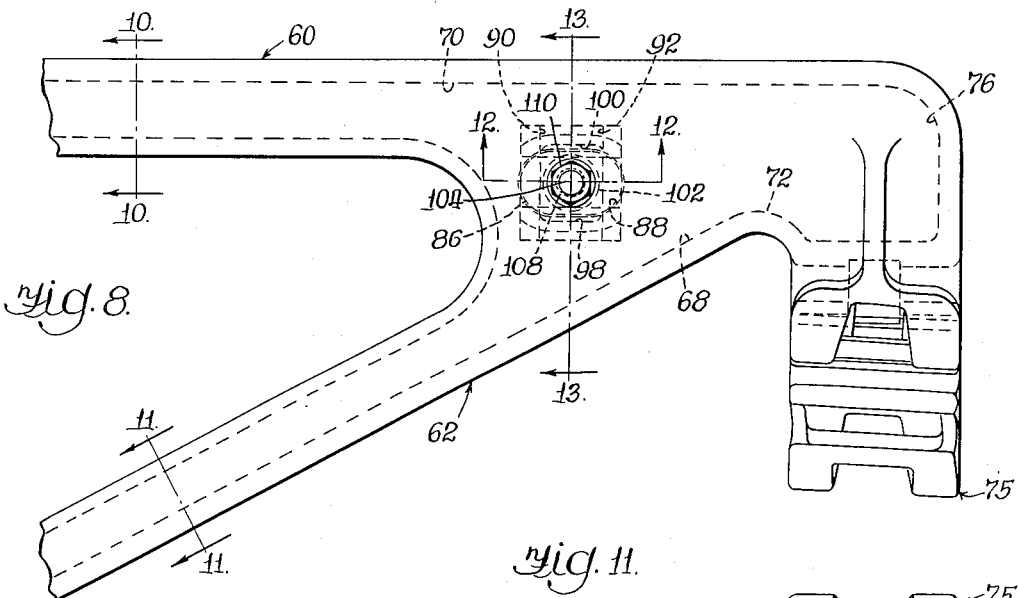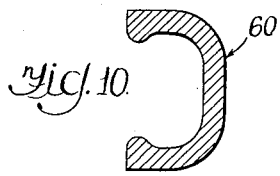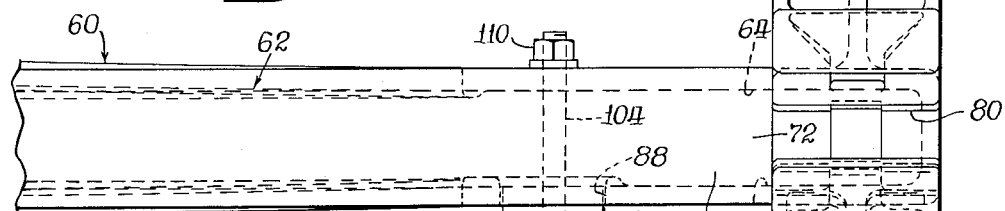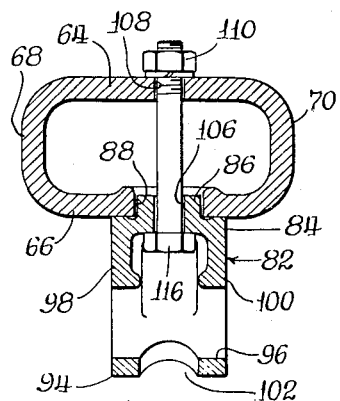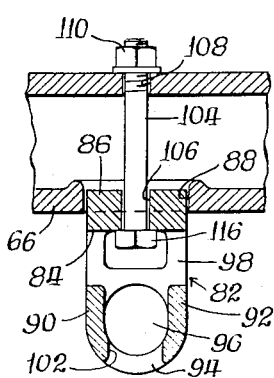

2,722,292
BRAKE BEAM WITH SAFETY SUPPORT

Eugene G. Opsahl, Chicago, Ill., assignor to American Steel Foundries, Chicago, Ill., a corporation of New Jersey Application August 1, 1952, Serial No. 302,199

6 Claims. (Cl. 188—226.1)

This invention relates to truss type railway brake beams and more particularly to a brake beam comprising a detachable safety support.

A primary object of the invention is to devise a brake beam in the form of a casting adapted for convenient connection to an associated safety support member.

A further object of the invention is to devise an arrangement in which the support member is attached to the beam in such manner as to resist torsional forces on the support member.

A more specific object of the invention is to devise an arrangement such as above described, wherein the support member may be attached to the beam by a single elongated retainer, such as a bolt.

The foregoing and other objects and advantages of the invention will become apparent from a consideration of the following specification and the accompanying drawings, wherein:

Figure 1 is a fragmentary top plan view of a brake beam structure embodying the invention, only one end of the beam being illustrated, inasmuch as it is preferably symmetrical about its transverse center line;

Figure 2 is a front elevational view of the structure shown in Figure 1;

Figures 3 to 7, inclusive, are sectional views on the lines 3—3, 4—4, 5—5, 6—6 and 7—7, respectively, of Figure 1;

Figure 8 is a fragmentary top plan view of a modified brake beam structure embodying the invention;

Figure 9 is a front elevational view of the structure shown in Figure 8;

Figures 10 to 13, inclusive, are sectional views taken, respectively, on the lines 10—10, 11—11, 12—12 and 13—13 of Figure 8;

Figure 14 is a fragmentary top plan view of a brake beam structure embodying another modification of the invention;

Figure 15 is a front elevational view of the structure shown in Figure 14; and

Figures 16 and 17 are sectional views taken, respectively, on the lines 16—16 and 17—17 of Figure 14.

Describing the invention in detail and referring first to the embodiment illustrated in Figures 1 to 7, the brake beam casting illustrated therein is preferably formed of steel and comprises a compression member, generally designated 2. This member is preferably of T-section having a rear substantially vertical web 4 defining the head of the T and having a forward substantially horizontal web 6 defining the leg of the T. The novel brake beam casting also comprises a T-section tension member, generally designated 8, having a forward substantialy vertical web 10 defining the head of the T and having a rear substantially horizontal web 12 defining the leg of the T. It may be noted that the tension and compression members 2 and 8 are interconnected in the usual manner by a strut or fulcrum (not shown) affording conventional connecting means for an associated brake lever (not shown).

The tension member 8, at its outboard end, also comprises a rear substantially vertical web 14 defining with the webs 10 and 12 and H-section, as seen in Figure 5, the web 12 forming the cross bar of the H. The tension member web 14 comprises an arcuate segment 16 at its outboard end merging with the outboard end of the compression member web 6 which flares in thickness toward its outboard end, or in other words, tapers in thickness as at 15 from its juncture with the arcuate segment 16 of the tension member web 14.

The arcuate segment 16 of the web 14 is also connected to a substantially linear segment 18, which is connected to the forward edge of the compression member web 4 and is connected to the outboard end of the tapering segment 15 of the compression member web 6.

Outboardly of the web segments 16 and 18, the compression member web 4 and these segments are connected to an outboardly tapering segment 20 of a substantially horizontal web 22, which merges with and flares in width from the outboard end of the tension member web 12, as best seen in Figure 1, said web 22 connecting the vertical webs 4 and 10 outboardly of the tension and compression members. The vertical web 10 extends arcuately along the forward edge of the web 22, as at 24, to merge with the front wall 26 of a conventional brake head generally designated 28.

The web 4 extends outboardly of the segment 18 along the rear edge of the web 22 and is connected to a rear, substantially vertical brake head wall 30; and the web 4 preferably extends outboardly of a rear brake head wall 30 to merge with a horizontal brake head wall 32 and define a support outboardly of the brake head wall 30 for engagement with a well known ledge (not shown) on a supporting structure, such as a freight car truck side frame (not shown). Also the brake head 28 may be provided with a conventional socket 34 (Figure 2) for reception of a pivotal hanger (not shown).

Detachably secured to the underside of the brake beam casting is a safety support member 36, which is preferably formed as an iron or steel casting and comprises a top web 38 tapered as at 41 for complementary flat face engagement with the lower surface of the web 22 and its tapered segment 20. The casting 36 also comprises spaced side walls 40 and 42 extending transversely of the brake beam and connecting the top wall 38 to an arcuate bottom wall 44 defining the lower margin of an eye or aperture 46 for the reception of an associated conventional safety support device (not shown). The aperture 46 extends between the side walls 40 and 42 of the casting which are provided with interconnecting ribs 48 and 50 defining the upper margin of the aperture 46.

The upper surface of the brake beam web 22 and its tapered segment 20 are provided with a flat annular boss or pad 52 around an opening 54 adapted for the reception of a bolt and nut assembly 56 or other suitable retainer which also passes through a complementary opening 58 of the wall 38 to secure the casting 36 firmly against the underside of the web 22 and its tapered segment 20.

It will be understood that the complementary tapered flat face engagement at 41 between the web segment 20 and the top casting wall 38 is effective to positively restrain the casting 36 against rotational movement about the longitudinal axis of the bolt and nut assembly 56, inasmuch as such movement in service would tend to loosen the bolt and nut assembly causing undesirable rattling and even possible loss of the support member 36.

Referring now to Figures 8 to 13, inclusive, a modification of the novel brake beam structure is illustrated wherein the brake beam casting comprises a compression member 60 of U-section and a tension member 62 of U-section merging at their outboard ends to define a box section having top and bottom webs 64 and 66, and front and rear webs 68 and 70, the web 68 terminating at its outboard end in an arcuate segment 72 (Figure 12) merging with the inboard edge of a front wall 74 of a conventional brake head 75. The rear web 70 also terminates at its outboard end in an arcuate segment 76, the forward edge of which merges with the outboard edge of the brake head wall 74, which is preferably provided with a conventional hanger socket 80 (Figure 13).

Detachably secured to the bottom web 66 is a support member 82 which is preferably in the form of an iron or steel casting comprising a top wall 84 having an oval-shaped boss 86 received within a complementary opening 88 of the web 66, to interlock the member 82 with the beam against rotational or horizontal movement relative thereto. The top wall 84 is connected to depending transverse walls 90 and 92 which are interconnected by an arcuate bottom wall 94 defining the lower margin of an eye or aperture 96, the upper margin of which is defined by depending ribs 98 and 100 on the underside of the top wall 84. The bottom wall 94 is cored away as at 102 to accommodate insertion and removal of a bolt 104 which extends through a complementary opening 106 of the wall 84 and through an aligned opening 108 of the web 64, the upper end of the bolt being provided with a nut 110 to draw the wall 84 upwardly into tight frictional engagement with the underside of the web 66.

It will be noted that the non-round configuration of the boss 86, and the complementary opening 88 of the web 66 is effective to positively restrain the support member 82 from rotational movement about the longitudinal axis of the bolt and nut assembly 104, 110 for the purpose heretofore described in connection with the embodiment of Figures 1 to 7. Furthermore, although the boss 86 and its complementary opening 88 are illustrated as oval in form, it will be understood that these parts may be of any other desired non-round configuration, such as square or hexagonal to restrain such undesired rotation of the support member 82.

Referring now to the embodiment illustrated in Figures 14 to 17, which is similar to that shown in Figures 10 to 13, corresponding parts are designated by corresponding numerals, and it will be understood that these two embodiments are substantially identical except that the boss 86 is eliminated and the end walls or ribs 98 and 100 of the support member 82 are provided with arcuate flanges or jaws 112 and 114, which snugly embrace the web 66 as well as the lower edges of the front and rear webs 68 and 70 to restrain undesirable rotation of the support member 82 about the longitudinal axis of the bolt and nut assembly 104, 110, as well as horizontal movement relative thereto.

As best seen in Figure 14, the flanges 112 and 114 are arranged in outboardly converging relationship to conform to the forward and rear surfaces of the brake beam webs 68 and 70, respectively. Thus it will be understood that in assembling the support member 82, in the modification of Figures 14 to 17, the member 82 may be positioned with its top wall 84 against the underside of the web 66 adjacent the inboard side of the brake head which is not illustrated in these figures, and thereafter the member 82 may be moved inboardly until the flanges 112 and 114 snugly embrace the webs 68 and 70, whereupon the opening 106 of the top wall 84 is aligned with the openings 88 and 108 of the brake beam webs 66 and 64, respectively, to accommodate insertion of the bolt 104 through the opening 102, which is sufficiently large to accommodate passage of the head 116 of the bolt, as in the previously described embodiment of Figures 8 to 13.

I claim:

1. In combination, a brake beam casting comprising integral tension and compression elements merging at their outboard ends with a substantially horizontal web member, a support beneath said web member, said support comprising spaced transverse walls interconnected by an arcuate bottom wall partly defining an aperture through said support, said support comprising a top wall member having an opening aligned with an opening of the web member, detachable securing means passing through said openings for drawing said top wall member into tight abutment with the underside of the web member, said support comprising ribs beneath said securing means, said ribs defining therebetween an opening for the passage of said securing means during assembly and disassembly thereof, and said ribs defining the upper margin of said aperture.

2. The combination of claim 1, wherein the bottom wall is provided with an opening aligned with the openings of the top wall member and web member and adapted for the passage of said securing means during assembly and disassembly thereof.

3. The combination of claim 1, and including restraining means on the top wall member and the web member comprising complementary interengaged surfaces for positively restraining relative rotational movement therebetween on a substantially vertical axis.

4. A combination of claim 3, wherein the restraining means are characterized by a non-round lug on one of the members projecting into a complementary non-round opening of the other member, said interengaged surfaces being offered by the lug and opening.

5. The combination of claim 3, wherein the restraining means are characterized by flanges on one member overlapping the forward and rear edges of the other member, said interengaged surfaces being offered by the flanges and the other member.

6. The combination of claim 3, wherein the interengaged surfaces comprise sloping surfaces on the underside of the web member and the upper side of the top wall member, respectively.

References Cited in the file of this patent

UNITED STATES PATENTS

| | | |
|---|---|---|
| 636,755 | Carliss | Nov. 14, 1899 |
| 698,524 | Lamont | Apr. 29, 1902 |
| 2,459,323 | Kass | Jan. 18, 1949 |
| 2,499,905 | Cottrell | Mar. 7, 1950 |